United States Patent [19]

Horie et al.

[11] Patent Number: 4,469,768
[45] Date of Patent: Sep. 4, 1984

[54] ELECTROPHOTOGRAPHIC LIGHT-SENSITIVE MATERIAL COMPRISING A CHARGE-GENERATING MATERIAL AND A CHARGE-TRANSPORTING MATERIAL

[75] Inventors: Seiji Horie, Saitama; Masayoshi Nagata, Kanagawa; Junji Nakano; Hideo Sato, both of Saitama, all of Japan

[73] Assignee: Fuji Photo Film Co., Ltd., Kanagawa, Japan

[21] Appl. No.: 388,369

[22] Filed: Jun. 14, 1982

[30] Foreign Application Priority Data

Jun. 12, 1981 [JP] Japan .................................. 56-90437

[51] Int. Cl.³ .............................................. G03G 5/06
[52] U.S. Cl. ........................................ 430/58; 430/78; 430/77
[58] Field of Search ..................... 430/58, 59, 78, 71, 430/77

[56] References Cited

U.S. PATENT DOCUMENTS

| | | | |
|---|---|---|---|
| 3,719,480 | 3/1973 | Brantly | 430/78 |
| 3,982,935 | 9/1976 | Bartlett | 430/78 |
| 4,105,447 | 8/1978 | Fox | 430/71 |
| 4,264,694 | 4/1981 | Pu et al. | 430/58 |
| 4,346,157 | 8/1982 | Kakuta et al. | 430/59 |

*Primary Examiner*—John E. Kittle
*Assistant Examiner*—John L. Goodrow
*Attorney, Agent, or Firm*—Sughrue, Mion, Zinn, Macpeak and Seas

[57] ABSTRACT

An electrophotographic light-sensitive material with an electrophotographic light-sensitive layer containing a charge-generating material and a charge-transporting material is described.

The material is characterized in that the charge-generating material is a compound represented by the general formula (I) or (II):

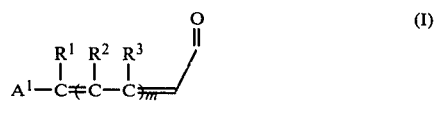

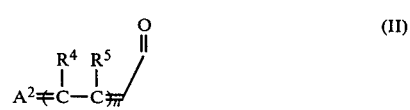

(wherein the symbols are the same as defined in the claims).

14 Claims, 3 Drawing Figures

ELECTROPHOTOGRAPHIC LIGHT-SENSITIVE MATERIAL COMPRISING A CHARGE-GENERATING MATERIAL AND A CHARGE-TRANSPORTING MATERIAL

FIELD OF THE INVENTION

The present invention relates to an electrophotographic light-sensitive material containing a charge-generating material and a charge-transporting material. More particularly, the invention relates to an electrophotographic light-sensitive material comprising a light-sensitive layer provided on an electrically conductive support wherein the light-sensitive layer contains a compound represented by the general formula (I) or (II) as defined hereinafter.

BACKGROUND OF THE INVENTION

In general, a photoconduction process which utilizes an electrophotographic light-sensitive material, comprises the steps of:

(1) generating electric charges by light-exposure; and
(2) transporting the electric charges.

Light-sensitive materials can be divided into a group in which the steps (1) and (2) above are performed by the same substance, and a group in which they are performed by different substances. A typical example of the former group is a selenium light-sensitive material. For the latter group, a combination of amorphous selenium and poly-N-vinyl carbazole is well known. Light-sensitive materials falling within the latter group have advantages in that a wide range of starting materials can be used in the preparation of the light-sensitive materials. This may make it possible to increase electrophotographic characteristics such as the sensitivity of light-sensitive material and receiving potential, and in that substances suitable for increasing these characteristics can be chosen from a wide range.

Photoconductive materials which have heretofore been used in light-sensitive materials to be used according to the electrophotographic system include inorganic substances such as selenium, cadmium sulfide, and zinc oxide.

The electrophotographic process disclosed by Carlson in U.S. Pat. No. 2,297,691, uses a photoconductive material comprising a support coated with a substance which is insulative in a dark place and changes its electric resistance depending on the amount of light irradiated during imagewise exposure. In general, the photoconductive material, after being subjected to dark conditioning for a suitable period of time, is uniformly provided with electric charges on the surface thereof in a dark place. Thereafter, the material is exposed imagewise according to a pattern of irradiation having the effect of reducing surface electric charges depending on the relative energy contained in various parts of the pattern. The surface electric charges thus allowed to remain on the photoconductive substance layer (light-sensitive layer), i.e., an electrostatic latent image, is converted into a visible image by bringing the photoconductive substance layer into contact with suitable detection-indicating substances, i.e., toners.

These toners can be drawn to the surface of the light-sensitive layer according to an electric charge pattern even though they are contained in an insulative liquid or in dry carriers. The thus-drawn toners can be fixed by known techniques such as application of heat, pressure of solvent vapor. Furthermore, the electrostatic latent image can be transferred to a second support. Similarly, the electrostatic latent image can be transferred to a second support (e.g., paper and a film) where it is developed.

Some of the fundamental characteristics required for the light-sensitive material for use in the electrophotographic process are:

(1) It can be charged at a suitable potential in a dark place;
(2) Little or no dissipation of electric charges occurs in a dark place; and
(3) Irradiation with light permits rapid dissipation of electric charges.

The above described inorganic substances which have heretofore been used as photoconductive materials suffer from various disadvantages although they have many advantages. For example, selenium that is presently in widespread use sufficiently meets the above requirements (1) to (3). However, use of this material is not desirable because production conditions are severe, production costs are high, flexibility is poor, it is difficult to shape into a belt-like form. Furthermore, care must be taken in handling since it is of low resistance against heat or mechanical impact. Cadmium sulfide and zinc oxide are used as light-sensitive materials in which they are dispersed in resins as binders. However, they cannot be used repeatedly as such since they are inferior in mechanical properties such as smoothness, hardness, tensile strength, and frictional resistance.

In recent years, to remove the above described defects of the inorganic substances, electrophotographic light-sensitive materials prepared using various organic substances have been proposed, and some of the light-sensitive materials have been put into practical use. Examples include a light-sensitive material containing poly-N-vinyl carbazole and 2,4,7-trinitrofluorene-9-on as described in U.S. Pat. No. 3,484,237, a light-sensitive material containing poly-N-vinyl carbazole which is sensitized with pyrylium salt-based dye, as described in Japanese Patent Publication No. 25658/73, a light-sensitive material containing organic pigment as a major component as described in Japanese Patent Application (OPI) No. 37543/72 (the term "OPI" is used herein to refer to a "published unexamined Japanese Patent application), and a light-sensitive material containing an eutectic complex of a dye and a resin, as described in Japanese Patent Application (OPI) No. 10735/72. These light-sensitive materials are believed to have excellent characteristics and to be of high practical value. In practice, however, no light-sensitive material sufficiently satisfies all the requirements for a light-sensitive material, e.g., convenient to produce, exhibits satisfactory electrophotographic characteristics, and a good wavelength selectivity which is required when the light-sensitive material is used as a laser beam printer or an indication element.

As a result of extensive study on charge-generating materials, it has been found that the compounds represented by the general formula (I) or (II) as defined hereinafter exhibits excellent performance as charge-generating materials, and sufficiently satisfy the requirements for light-sensitive materials.

Merocyanine dyes are known as spectral sensitizing dyes for silver salt photographs, and have been extensively studied in that field. In recent years, an attempt to use these cyanine dyes in light-sensitive materials for electrophotography, particularly as electrically light- sensitive particles for use in the electrophoretic image-forming process has been made, but they do not exhibit satisfactory characteristics.

It has been found that the compounds represented by the general formula (I) or (II) as defined hereinafter have excellent charge-generating capability. Furthermore, the electrophotographic light-sensitive materials prepared using the compounds as charge-generating materials in combination with charge-transporting materials are of very high sensitivity and are convenient to produce. These materials have good durability and exhibit sufficiently satisfactory electrophotographic characteristics.

Furthermore, it has been found that the electrophotographic light-sensitive materials have good wavelength selectivity which is required when they are used as laser beam printers or indicating elements. In addition, the compounds of the invention can be uniformly dispersed as charge-generating materials together with charge-transporting materials. They may be advantageous toward obtaining light-sensitive materials of high transparency.

SUMMARY OF THE INVENTION

The present invention relates to an electrophotographic light-sensitive material with an electrophotographic light-sensitive layer containing a charge generating material and a charge-transporting material wherein the charge-generating material is a compound represented by the general formula (I) or (II), wherein
(i) m is 0 or 1, n is 0, 1 or 2:
(ii) $R^1$ and $R^5$ may be the same or different, and are each a hydrogen atom, an alkyl group, an aralkyl group, an aryl group or heterocyclic group;
(iii) $A^1$ is a univalent group derived from a substituted phenyl group, a monocyclic or condensed 5-membered heterocyclic ring, or a condensed 6-membered heterocyclic ring represented by the following general formulae:

wherein $R^6$ is an alkoxy group, an aralkyloxy group or a substituted amino group represented by the formula:

(wherein $R^{12}$ and $R^{13}$ may be the same or different, and are each a substituted or unsubstituted alkyl group, or a substituted or unsubstituted phenyl group, or they are groups capable of combining together to form a nitrogen-containing heterocyclic ring; $R^7$ and $R^8$ may be the same or different, and are each a hydrogen atom, a halogen atom, an alkyl group or a lower alkyl group; Y and Z may be the same or different, and are each a sulfur atom (S), an oxygen (O) or a group $N-R^{14}$ (wherein $R^{14}$ is an alkyl group containing 1 to 4 carbon atoms); $R^9$ and $R^{10}$ may be the same or different, and are each a hydrogen atom, an alkyl group or an alkoxy group, or they are groups capable of combining together to form a benzene ring or naphthalene ring; and $R^{11}$ is a hydrogen atom, an alkyl group, an alkoxy group, an aryloxy group, an acryl group, an alkoxycarbonyl group, an aryloxycarbonyl group, a halogen atom, a monoalkylamino group, a dialkylamino group, an amido group or a nitro group, which may be either substituted or not substituted;

(iv) $A^2$ is a divalent group derived from a heterocyclic ring nucleus selected from the group consisting of imidazole, 3H-indole, thiazole, benzothiazole, naphthothiazole, thianaphtheno-7', 6',4,5-thiazole, oxazole, benzooxazole, naphthooxazole, seneazole, benzoselenazole, naphthoselenazole, thiazoline, 2-quinoline, 4-quinoline, 1-isoquinoline, benzimidazole, 2-pyridine, and 4-pyridine; and (V) B is a group of atoms required for forming a divalent group which is derived from a carbon ring or heterocyclic ring containing the oxo oxygen atom of the carbonyl group linked to a ring represented by the formula:

-continued wherein W is O, S or $SO_2$; $R^{15}$ is the same as defined for $R^{11}$; $R^{16}$ is an alkyl group, an aralkyl group, or an unsubstituted or substituted aryl group; and $R^{17}$ and $R^{18}$ may be the same or different, and are each an alkyl group, an aralkyl group or an unsubstituted or substituted phenyl group.

An object of the invention is to provide an electrophotographic light-sensitive material having very high sensitivity, good durability and sufficiently satisfactory electrophotographic characteristics, and being convenient to produce. A further object of the present invention is to provide an electrophotographic light-sensitive material having an excellent charge-generating capability.

DETAILED DESCRIPTION OF THE INVENTION

The compounds represented by the general formula (I) and (II) will hereinafter be explained in detail.

Suitable examples of the groups represented by $R^1$, $R^2$, $R^3$, $R^4$ and $R^5$ include a hydrogen atom, an alkyl group containing 1 to 12 carbon atoms, e.g., a methyl group, an ethyl group, a butyl group, and an octyl group, an aralkyl group having 7 to 12 carbon atoms, e.g., a benzyl group and a phenetyl group, an aryl group having 6 to 10 carbon atoms, e.g., a phenyl group and a naphthyl group, and a heterocyclic group having a monocyclic 5- or 6-membered heterocyclic ring or a condensed 5 or 6-membered heterocyclic ring, preferably containing at least one atom selected from the group consisting of S, N and O atoms, e.g., a 2-thienyl group and a 2-furyl group.

The substituted phenyl group:

represented by $A^1$ is explained in detail below:

The alkoxy group or aralkyloxy group represented by $R^6$ contains from 1 to 12 carbon atoms. Suitable examples include a methocy group, an ethoxy group, a propoxy group, a butoxy group, an octyloxy group, and a benzyloxy group.

In the substituted amino group represented by the formula:

$R^{12}$ and $R^{13}$ each represent an unsubstituted alkyl group containing from 1 to 12 carbon atom, e.g., a methyl group, an ethyl group, a propyl group, and a butyl group, or an alkyl group which contains from 1 to 12 carbon atoms and has the substituent as described hereinafter.

Substituents for the substituted alkyl group represented by $R^{12}$ and $R^{13}$ include an alkoxy group containing from 1 to 4 carbon atoms, an aryloxy group containing from 6 to 12 carbon atoms, a hydroxy group, an aryl group containing from 6 to 12 carbon atoms, a cyano group, and a halogen atom.

Preferred examples of the alkyl groups which are substituted, as represented by $R^{12}$ and $R^{13}$, include (a) an alkoxyalkyl group, e.g., methoxymethyl, methoxyethyl, ethoxymethyl, ethoxyethyl, ethoxypropyl, methoxybutyl, and propoxymethyl, (b) an aryloxyalkyl group, e.g., phenoxymethyl, phenoxyethyl, naphthoxymethyl, and phenoxypentyl, (c) a hydroxyalkyl group, e.g., hydroxyethyl, hydroxypropyl, hydroxyoctyl, and hydroxymethyl, (d) an aralkyl group, e.g., benzyl, phenetyl, and $\omega,\omega$-diphenylalkyl, (e) a cyanoalkyl group, e.g., cyanomethyl, cyanoethyl, cyanopropyl, cyanobutyl, and cyanooctyl, and (f) a haloalkyl group, e.g., chloromethyl, bromomethyl, chloroethyl, bromopentyl, and chlorooctyl.

The phenyl group represented by $R^{12}$ and $R^{13}$ may be substituted. Suitable examples of such substituents include (a) an alkyl group containing from 1 to 12 carbon atoms, (b) an alkoxy group containing from 1 to 4 carbon atoms, (c) an aryloxy group containing from 6 to 7 carbon atoms, (d) an acyl group containing from 2 to 8 carbon atoms, (e) an alkoxycarbonyl group containing from 2 to 5 carbon atoms, (f) a halogen atom, (g) a monoalkylamino group which is substituted by an alkyl group containing from 1 to 4 carbon atoms, (h) a dialkylamino group which is substituted by an alkyl group containing from 1 to 4 carbon atoms, (i) an amido group containing from 2 to 4 carbon atoms, any (j) a nitro group.

Examples of alkyl groups containing from 1 to 12 carbon atoms of (a) above include a methyl group, an ethyl group, a straight or branched propyl group, a butyl group, a pentyl group, and a hexyl group. Examples of alkoxy groups containing from 1 to 4 carbon atoms of (b) include a methoxy group, an ethoxy group, a propoxy group, and a butoxy group. Examples of aryloxy groups of (c) include a phenoxy group, and an o-, m- or p-tolyloxy group. Examples of acyl groups of (d) include an acetyl group, a propionyl group, a benzoyl group, and an o-, m- or p-toluoyl group. Examples of alkoxycarbonyl groups containing from 2 to 5 carbon atoms include a methoxycarbonyl group, an ethoxycarbonyl group, a propoxycarbonyl group, and a butoxycarbonyl group. Halogen atoms of (f) include a chlorine atom, a bromine atom, and a fluorine atom. Monoalkylamino groups substituted by an alkyl group containing from 1 to 4 carbon atoms of (g) include a methylamino group, an ethylamino group, and a butylamino group. Dialkylamino groups which are substituted by an alkyl group containing from 1 to 4 carbon atoms of (h) include a dimethylamino group, a diethylamino group, a dipropylamino group, a dibutylamino group, and a N-methyl-N-ethylamino group. Amido groups of (i) include an acetamido group, and a propionamido group. Another substituent is a nitro group of (j).

Preferred examples of the heterocyclic rings which are formed when $R^{12}$ and $R^{13}$ combine together are represented by the following formulae:

$R^6$ is preferably a substituted amino group, in which $R^{12}$ and $R^{13}$ are each a methyl group, an ethyl group, a benzyl group, a phenyl group or a tolyl group. Particularly preferred are a dimethylamino group, a diethylamino group, a dibenzylamino group, a diphenylamino group, an N-ethyl-N-phenylamino group, and so forth.

$R^7$ and $R^8$ each represent a hydrogen atom, a halogen atom, e.g., a chlorine atom, a bromine atom, and a fluorine atom, an alkyl group containing from 1 to 4 carbon atoms, e.g., a methyl group, an ethyl group, a propyl group, and a butyl group, an alkoxy group containing from 1 to 4 carbon atoms, e.g., a methoxy group, an ethoxy group, a propoxy group, and a butoxy group, and the like. Of these groups, a hydrogen atom, a methyl group, and a methoxy group are preferred.

Groups represented by $R^9$ and $R^{10}$ which are substituents for the 5-membered heterocyclic ring of the formula:

as indicated by $A^1$ include a hydrogen atom, an alkyl group containing from 1 to 4 carbon atoms, e.g., a methyl group, an ethyl group, a propyl group, and a butyl group, an alkoxy group containing from 1 to 4 carbon atoms, e.g., a methoxy group, an ethoxy group, a propoxy group, and a butoxy group, and those groups which are capable of combining together to form a benzene ring or naphthalene ring.

The substituent $R^{11}$ of the condensed heterocyclic ring represented by the formula:

or represents a hydrogen atom, a substituted or unsubstituted alkyl group which is the same as defined for the substituted or unsubstituted alkyl group represented by $R^{12}$ or $R^{13}$, an alkoxy group containing from 1 to 4 carbon atoms, an aryloxy group containing from 6 to 10 carbon atoms, an acyl group containing from 2 to 11 carbon atoms, an alkoxycarbonyl group containing from 2 to 5 carbon atoms, an aryloxycarbonyl group containing from 7 to 11 carbon atoms, a monoalkylamino group containing from 1 to 4 carbon atoms, a dialkylamino group containing from 1 to 4 carbon atoms, an amido group containing from 2 to 9 carbon atoms, or a nitro group. These groups may be either substituted or not substituted.

Examples of alkoxy groups containing from 1 to 4 carbon atoms include a methoxy group, an ethoxy group, a propoxy group, and a butoxy group. Examples of aryloxy groups include a phenoxy group, and an o-, m- or p-tolyloxy group. Examples of acyl groups include an acetyl group, a propionyl group, a benzoyl group, and an o-, p-, or m-toluoyl group. Examples of alkoxycarbonyl groups containing from 2 to 5 carbon atoms include a methoxycarbonyl group, an ethoxycarbonyl group, a propoxycarbonyl group, and a butoxycarbonyl group. Examples of aryloxycarbonyl groups containing from 7 to 11 carbon atoms include a phenoxycarbonyl group, and an o-, p-, or m-tolyloxycarbonyl group. Halogen atoms include a chlorine atom, a bromine atom, and a fluorine atom. Monoalkylamino groups containing an alkyl group containing from 1 to 4 carbon atoms include a methylamino group, an ethylamino group, and a butylamino group. Dialkylamino groups which are substituted by an alkyl group containing from 1 to 4 carbon atoms include a dimethylamino group, a diethylamino group, a dipropylamino group, a dibutylamino group, and an N-methyl-N-ethylamino group. Amido groups include an acetamido group, and a propionamido group. Other substituents include a nitro group.

Examples of 5-membered heterocyclic rings represented by $A^1$ include a 2-furyl group, a 2-thienyl group, a 1-methyl-2-pyrrolyl group, and a 5-methyl-2-thienyl group. Examples of condensed 5-membered heterocyclic rings include a 2-benzo[b] thienyl group, a 2-naphtho-[2,3-b]thienyl group, 9-ethylcarbazol-2-yl group, and a dibenzothiophen-2-yl group. Examples of condensed 6-membered heterocyclic rings include a 2-phenoxathiinyl group, a 10-ethylphenoxazin-3-yl group, and a 10-ethylphenohiazin-3-yl group.

2-Phenoxathiinyl

10-Ethylphenoxazin-3-yl

10-Ethylphenothiazin-3-yl

Of the above described compounds, a 5-methyl-2-thienyl group, a 2-benzo[b]thienyl group, a 9-ethylcarbazol-2-yl group, a dibenzothiopen-2-yl group, and a 10-ethylphenothiazin-3-yl group are preferred.

$A^2$ represents a divalent group derived from a heterocyclic nucleus selected from the following nuclei:

(a) Imidazole nuclei, e.g., 4-phenylimidazole;
(b) 3H-Indole nuclei, e.g., 3H-indole, 3,3-dimethyl-3H-indole, and 3,3,5-trimethyl-3H-indole;
(c) Thiazole nuclei, e.g., thiazole, 4-methylthiazole, 4-phenylthiazole, 5-methylthiazole, 5-phenylthiazole, 4,5-dimethylthiazole, 4,5-diphenylthiazole, and 4-(2-thienyl)thiazole;
(d) Benzothiazole nuclei, e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-methylenedioxybenzothiazole, 5-hydroxybenzothiazole, and 6-hydroxybenzothiazole;
(e) Naphthotiazole nuclei, e.g., naphtho[1,2-d]thiazole, naphtho[2,1-d]thiazole, naphtho[2,3-b]thiazole, 5-methoxynaphtho[2,1-d]thiazole, 5-ethoxynaphtho[2,1-d]thiazole, 8-methoxynaphtho[1,2-d]thiazole, and 7-methoxynaphtho[1,2-d]thiazole;
(f) Thianaphtheno-7',6',4,5-thiazole nuclei, e.g., 4'-methoxythianaphtheno-7',6',4,5-thiazole;
(g) Oxazole nuclei, e.g., 4-methyloxazole, 5-methyloxazole, 4-phenyloxazole, 4,5-diphenyloxazole, 4-ethyloxazole, 4,5-dimethyloxazole, and 5-phenyloxazole;
(h) Benzoxazole nuclei, e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, and 6-hydroxybenzoxazole;
(i) Naphthoxazole nuclei, e.g., naphtho[1,2-d]oxazole, and naphtho[2,1-d]oxazole;
(j) Selenazole nuclei, e.g., 4-methylselenazole, and 4-phenylselenazole;
(k) Benzoselenazole nuclei, e.g., benzoselenazole, 5-chlorobenzoselenazole, 5-methoxybenzoselenazole, 5-hydroxybenzoselenazole, and tetrahydrobenzoselenazole;
(l) Naphthoselenazole nuclei, e.g., naphtho[1,2-d]selenazole, and naphtho[2,1-d]selenazole;
(m) Thiazoline nuclei e.g., thiazoline and 4-methylthiazoline;
(n) 2-Quinoline nuclei, e.g., 2-quinoline, 3-methyl-2-quinoline, 5-methyl-2-quinoline, 7-methyl-2-quinoline, 8-methyl-2-quinoline, 6-chloro-2-quinoline, 8-chloro-2-quinoline, 6-methoxy-2-quinoline, 6-ethoxy-2-quinoline, 6-hydroxy-2-quinoline, and 8-hydroxy-2-quinoline;
(o) 4-Quinoline nuclei, e.g., 4-quinoline, 6-methoxy-4-quinoline, 7-methyl-4-quinoline, and 8-methyl-4-quinoline;
(p) 1-Isoquinoline nuclei, e.g., isoquinoline, and 3,4-dihydroisoquinoline;
(q) Benzimidazole nuclei, e.g., 1,3-diethylbenzimidazole and 1-ethyl-3-phenylbenzimidazole;
(r) 2-Pyridine nuclei, e.g., pyridine and 5-methylpyridine; and
(s) 4-Pyridine nuclei.

Suitable examples of the substituents represented by $R^{16}$, which are the substituents for the nucleus having the atom group, B, required for forming the divalent group which is derived from the carbon ring or heterocyclic ring containing the oxo oxygen atom of the carbonyl group linked to the rings as illustrated in (v) as defined hereinbefore (the nucleus is hereinafter referred to as a "B nucleus") are alkyl groups containing from 1 to 12 carbon atoms, e.g., a methyl group, an ethyl group, a butyl group, and an octyl group, aralkyl groups, e.g., a benzyl group, and a phenetyl group, aryl groups, e.g., a phenyl group, and a naphthyl group, and substituted aryl groups, in which the substituents are the same as defined for the substituted phenyl groups represented by $R^{12}$ or $R^{13}$. Suitable examples of $R^{17}$ and $R^{18}$ include alkyl groups containing from 1 to 12 carbon atoms, e.g., a methyl group, an ethyl group, a butyl group, and an octyl group, aralkyl groups, e.g., a benzyl group and a phenetyl group, a phenyl group, and substituted phenyl groups in which the substituents are the same as defined for the substituted phenyl groups represented by $R^{12}$ and $R^{13}$.

Preferred examples of B nuclei include benzofuran-3-on, 1,3-indandion, and 2-phenyloxazol-5-on nuclei.

Suitable examples of the compounds represented by the general formulae (I) and (II) are shown below:

(1)

(17)

(18)

(19)

(20)

(21)

(22)

(23)

(24)

(25)

(26)

(27)

(28)

(29)

(30)

(31)

(32)

(33)

(34)

-continued

(35)

(36)

(37)

(38)

(39)

(40)

(41)

(42)

-continued (43)

(44)

The compounds represented by the general formula (I) or (II) can be easily prepared by the methods described in M. Crawford and W. T. Little, *J. Chem. Soc.*, 1959, 729, N. A. Dimond and T. K. Mukherjee, *Discuss. Faraday Soc.*, 1971, (51), 102, E. B. Knott, *J. Chem. Soc.*, 1963, 402, T. Tsumaki, *Bull. Chem. Soc. Japan*, 6, 1 (1931), ibid, 7, 45 (1932), L. G. S. Brooker et al., *J. Am. Chem. Soc.*, 73, 5332 (1951), and M. Huke and K. Görlitzen, *Arch. Pharm.*, 302, 401 (1969), and other known methods. Each of these references are incorporated herein by reference to disclosed methods of preparing compounds of formula (I) or (II).

The compounds represented by the general formula (I) can be prepared from the aldehydes or ketones represented by the general formula (III) as defined hereinafter and the B nuclei having the active methylene group, and the compounds represented by the general formula (II) can be prepared from the alkylthio, acetoanilidovinyl or acetoanilidobutadienyl derivatives of quaternary salt of the $A^2$ nuclei and the B nuclei having the active methylene group, which are, if necessary, after addition of a small amount of a secondary or tertiary amine (e.g., piperidine, morpholine and triethylamine) or an ammonium acetate as a condensation agent, reacted in a solvent by the usual technique. When the reaction does not proceed smoothly, it is preferred to use aldehydes or ketones as acetal or imine derivatives thereof. Solvents which can be used include alcohols, e.g., methanol and ethanol, aromatic hydrocarbons, e.g., benzene and xylene, dioxane, tetrahydrofuran, N,N-dimethylformamide, and acetic acid. These solvents can be used singly or in combination with each other.

(III)

wherein $A^1$, $R^1$, $R^2$, $R^3$ and m are the same as defined for $A^1$, $R^1$, $R^2$, $R^3$ and m of the general formula (I).

In the light-sensitive material of the invention, the compound represented by the general formula (I) or (II) is used as a charge-generating material in combination with a charge-transporting material. The variations of the light-sensitive material of the invention are illustrated in FIGS. 1 to 3.

Figure 1:
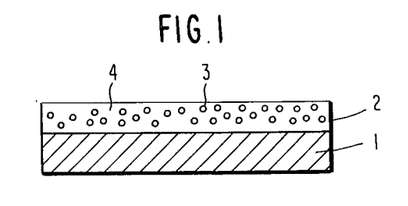
FIG. 1 is a cross-sectional view of an electrophotographic light-sensitive material of the invention, which is enlarged in the direction of thickness.

FIG. 1 illustrates an electrophotographic light-sensitive material comprising a support 1 in which at least the surface is electrically conductive and an electrophotographic light-sensitive layer 2 thereon in which a compound 3, i.e., a charge-generating material represented by the general formula (I) or (II), is dispersed, either uniformly or non-uniformly, in a charge-transporting medium 4 comprising a charge-transporting material and a binder.

Figure 2:
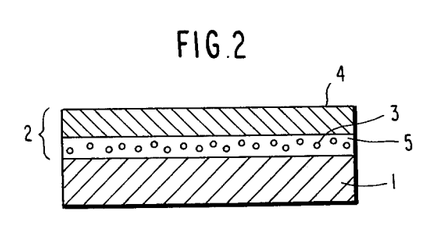
FIG. 2 is a cross-sectional view of another embodiment of the electrophotographic light-sensitive material of the invention, which is also enlarged in the direction of thickness.

FIG. 2 illustrates an electrophotographic light-sensitive material comprising a support 1 in which at least the surface is electrically conductive and an electrophotographic light-sensitive layer 2 on the support, in which the electrophotographic light-sensitive layer 2 comprises a charge-generating layer 5 composed mainly of a compound 3 represented by the general formula (I) or (II), said compound 3 being uniformly or non-uniformly or non-uniformly dispersed, and a charge-transporting layer 4 containing a charge-transporting material.

Figure 3:
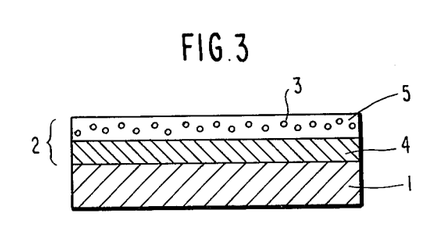
FIG. 3 is a cross-sectional view of another embodiment of the electrophotographic light-sensitive material, which is also enlarged in the direction of thickness.

The electrophotographic light-sensitive material of the invention as illustrated in FIG. 3 comprises a support 1 wherein at least the surface is electrically conductive, and an electrophotographic light-sensitive layer 2 wherein the light-sensitive layer 2 comprises a charge-transporting layer 4 containing a charge-transporting material, and a charge-generating layer 5 thereon composed mainly of a compound 3 represented by the general formula (I) or (II), which is uniformly or non-uniformly dispersed.

In preparing the light-sensitive material of FIG. 1, the compound represented by the general formula (I) or (II) is dissolved or dispersed in a solution in which the charge-transporting material and binder have been dissolved. The resulting solution is coated on the electrically conductive support and dried.

The light-sensitive material of FIG. 2 is prepared as follows:

The compound represented by the general formula (I) or (II) is vacuum deposited on the electrically conductive support, or alternatively the compound is dispersed in a suitable solvent in which, if necessary, a binder has been dissolved and the resulting dispersion is coated on the support and dried. If necessary, surface finishing is performed by techniques such as buff abrasion, or the film thickness is adjusted. Thereafter, a solution containing the charge-transporting material and binder is coated on the above prepared layer, and dried. Coating can be conducted by various techniques such as doctor blade coating and wire bar coating.

The light-sensitive material of FIG. 3 is prepared as follows:

A solution containing the charge-transporting material and binder is coated on the electrically conductive support by the usual technique, and dried. Thereafter, in the same manner as described for the light-sensitive material of FIG. 2, the charge-generating layer is provided.

The thickness of the light-sensitive layer is from 3 to 50 $\mu$m, preferably from 5 to 20 $\mu$m, for the light-sensitive material of FIG. 1. In the light-sensitive materials of FIGS. 2 and 3, the thickness of the charge-generating layer is 5 $\mu$m or less, preferably 2 $\mu$m or less, and the thickness of the charge-transporting layer is from 3 to 50 $\mu$m and preferably from 5 to 20 $\mu$m.

The proportion of the charge-transporting material in the light-sensitive layer for the light-sensitive material of FIG. 1 is from 10 to 150% by weight, preferably from 30 to 100% by weight, based on the weight of the binder. The proportion of the compound represented by the general formula (I) or (II) is from 1 to 150% by weight, preferably from 5 to 50% by weight, based on the weight of the binder.

In the light-sensitive materials shown in FIGS. 2 and 3, the proportion of the charge-transporting material in the charge transporting layer is from 10 to 150% by weight and preferably from 30 to 100% by weight as is the case with the light-sensitive layer of the light-sensitive material of FIG. 1. In any light-sensitive materials shown in FIGS. 1 to 3, a plasticizer can be used in combination with the binder. When the charge-generating layer is a dispersion system comprising the charge-generating material and a polymerous binder, it is preferred to use the polymerous binder in an amount of 10 parts by weight or less per 1 part by weight of the compound represented by the general formula (I) or (II).

In the light-sensitive material of the invention, there may be used a layer substantially composed of only the compound of the general formula (I) or (II). In this case, the charge-generating layer can be formed, for example, by vapor depositing the compound represented by the general formula (I) or (II) on the electrically conductive layer or charge-transporting layer, or by coating a coating solution which has been prepared by dissolving or dispersing the compound represented by the general formula (I) or (II) in a solvent which can be removed by evaporation.

Electrically conductive supports in which at least the surface is electrically conductive that can be used in the invention include known metal plates or foils, e.g., aluminum plates or foils, plastic films in which metals, e.g., aluminum, are vapor deposited, and paper which is subjected to a treatment to make it electrically conductive. Binders which can be used include condensation resins, e.g., polyamides, polyurethanes, polyesters, epoxy resins, polyketones, and polycarbonates, and vinyl polymers, e.g., polyvinyl ketone, polystyrene, poly-N-vinyl carbazole, and polyacrylamide. All resins which are insulative and have adhesive properties can be used.

Plasticizers which can be used include biphenyl, chlorinated biphenyl, o-terphenyl, p-terphenyl, dibutyl phthalate, dimethyl glycol phthalate, dioctyl phthalate, triphenylphosphic acid, methyl naphthalene, benzophenone, chlorinated paraffin, polypropylene, polystyrene, dilaurylthio dipropionate, 3,5-dinitrosalicylic acid, and fluorohydrocarbons.

Charge-transporting materials which can be used in the electrophotographic light-sensitive materials illustrated in FIGS. 1 to 3 include triphenylamine derivatives as described in, for example, U.S. Pat. No. 3,567,450, Japanese Patent Publication No. 35702/74, and West Germany Patent (DAS) No. 1,110,518, polyarylalkane derivatives as described in, for example, U.S. Pat. No. 3,542,544, Japanese Patent Publication No. 555/70, and Japanese Patent Application (OPI) No. 93224/76, pyrazoline derivatives as described in for example, Japanese Patent Application (OPI) Nos. 72231/77 and 105537/74, and Japanese Patent Publication No. 4188/77, and hydrazone derivatives as described in, for example, U.S. Pat. Nos. 3,717,462 and 4,150,987 (corresponding to Japanese Patent Application (OPI) No. 59143/79), Japanese Patent Application (OPI) Nos. 52063/80, 52064/80, 46760/80, 85495/80, and Japanese Patent Application No. 85495/80. In some cases, these charge-transporting materials can be used as mixtures comprising two or more thereof.

In the light-sensitive material of the invention, the light-sensitive wavelength region can be controlled by using two or more compounds represented by the general formula (I) or (II), having different light-sensitive wavelength regions. However, it is also possible to control the light-sensitive wavelength region by using known dye-sensitizers in combination.

With the thus-prepared light-sensitive material, if necessary, an adhesive layer or a barrier layer can be provided between the electrically conductive support and the light-sensitive layer. Materials which can be used for the adhesive layer or barrier layer include polyamides, cellulose nitrate, and aluminum oxide. The thickness of the adhesive layer or barrier layer is preferably 1 μm or less.

The light-sensitive material of the invention is of very high sensitivity, is convenient to prepare, and has excellent durability. Furthermore, it offers the advantage that the wavelength selectivity which is required for the electrophotographic light-sensitive material when it is used as a laser beam printer or an indication element is very high.

The light-sensitive material of the invention has the commercial advantage that it can find various uses, for example, it can be used to provide a printing plate (lithographic or letterpress) of high resolving power, high durability, and high sensitivity, by exposing image-wise to form a toner image and, thereafter, etching.

The following examples are given to illustrate the invention in greater detail although the invention is not limited thereto. All parts are by weight.

EXAMPLE 1

A hydrazone compound having the formula as shown below was used as a charge-transporting material.

A mixture of 2 parts of the hydrazone compound and 5 parts of polycarbonate was dissolved in 130 parts of dichloromethane.

In the thus-prepared charge-transporting material solution was dissolved 1 part of Compound (7) as described hereinbefore to prepare a coating liquid for an electrophotographic light-sensitive layer.

The coating liquid was coated on an electrically conductive, transparent support (100 μm thick polyethylene terephthalate with a vapor deposited film of indium oxide; surface resistance: 103 Ω) by the use of a wire wound rod and dried to prepare a light-sensitive material with an about 7 μm thick mono-layer type electrophotographic light-sensitive layer.

The light-sensitive material was positively charged by +5 KV corona discharge with an electrostatic copying paper testing apparatus (Model SP-428, produced by Kawaguchi Denki Seisakujo Co., Ltd.) and, thereafter, was irradiated with light by the use of a 3000° K. tungsten lamp so that the intensity of illumination of the surface was 30 lux. The time required for the surface potential to attenuate to half the initial surface potential was measured to determine the half decay exposure amount $E_{50}$ (lux.sec). $E_{50}$ was 80 lux.sec.

EXAMPLE 2

4,4'-Bis(diethylamino)-2,2'-dimethyltriphenylmethane was used as a charge-transporting material. A mixture of 4 parts of the charge-transporting material and 5 parts of polycarbonate of bisphenol A was dissolved in 130 parts of dichloromethane to prepare an charge-transporting material solution.

In the charge-transporting material solution was dissolved 2 parts of Compound (6) as described hereinbefore to prepare a coating liquid for an electrophotographic light-sensitive layer.

The coating liquid was coated and dried in the same manner as in Example 1 to prepare a light-sensitive material with a 7 μm thick mono-layer type electrophotographic light-sensitive layer.

The sensitivity of the light-sensitive material was measured in the same manner as in Example 1, and $E_{50}$ was 460 lux.sec.

EXAMPLES 3 TO 23

A light-sensitive material with a mono-layer type electrophotographic light-sensitive layer was prepared in the same manner as in Example 2 except that each of the compounds shown in Table 1 was used in place of the charge-generating material used in the example 2, Compound (6).

With each light-sensitive material, $E_{50}$ was measured, and the results are shown in Table 1.

TABLE 1

| Example | Compound represented by General Formula (I) or (II) | $E_{50}$ (lux · sec) |
| --- | --- | --- |
| 3 | (1) | 4570 |
| 4 | (2) | 45800 |
| 5 | (5) | 2350 |
| 6 | (7) | 08 |
| 7 | (8) | 440 |
| 8 | (10) | 553 |
| 9 | (12) | 215 |
| 10 | (13) | 540 |
| 11 | (15) | 461 |
| 12 | (16) | 80 |
| 13 | (17) | 850 |
| 14 | (19) | 260 |
| 15 | (20) | 468 |
| 16 | (26) | 145 |
| 17 | (27) | 250 |
| 18 | (31) | 2040 |
| 19 | (32) | 200 |
| 20 | (35) | 3480 |
| 21 | (38) | 80 |
| 22 | (39) | 130 |
| 23 | (40) | 232 |

EXAMPLE 24

Compound (12) was vapor deposited on a 100 μm thick sand-grained aluminum plate at $2 \times 10^{-5}$ Torr and a vapor deposition temperature of 300° C. for 15 minutes to provide a 0.5 μm thick charge-generating layer.

Then, 5 parts of an charge-transporting material, 4,4'-bis(diethylamino)-2,2'-dimethyltriphenylmethane, and 4 parts of polycarbonate of bisphenol A were dissolved in 100 parts of dichloromethane. The resulting solution was coated on the above prepared charge-generating layer by a rotary coating method and dried to prepare an electrophotographic light-sensitive material with a 7 μm thick laminate type electrophotographic light-sensitive layer.

The light-sensitive material was measured in sensitivity in the same manner as in Example 1, and $E_{50}$ was 460 lux.sec.

What is claimed is:

1. An electrophotographic light-sensitive material with an electrophotographic light-sensitive layer containing a charge-generating material and a charge-transporting material wherein the charge-generating material is a compound represented by the general formula (I) or (II):

wherein

(i) m is 0 or 1, and n is 0, 1 or 2;

(ii) $R^1$, $R^2$, $R^3$, $R^4$ and $R^5$ may be the same or different, and are each a hydrogen atom, an alkyl group, an aralkyl group, an aryl group or a heterocyclic group;

(iii) $A^1$ is a univalent group which is derived from one of the substituted phenyl group, 5-membered monocyclic or condensed heterocyclic, and 6-membered condensed heterocyclic rings represented by the following formula:

(wherein $R^6$ is an alkoxy group, an aralkyloxy group or a substituted amino group represented by the formula:

(wherein $R^{12}$ and $R^{13}$ may be the same or different, and are each a substituted or unsubstituted alkyl group or a substituted or unsubstituted phenyl group, or groups capable of combining together to form a heterocyclic ring containing a nitrogen atom); $R^7$ and $R^8$ may be the same or different, and are each a hydrogen atom, a halogen atom, an alkyl group or a lower alkoxy group; Y and Z may be the same or different, and are each S, O or N-$R^{14}$ (wherein $R^{14}$ is an alkyl group containing from 1 to 4 carbon atoms); $R^9$ and $R^{10}$ may be the same or different, and are each a hydrogen atom, an alkyl group or an alkoxy group, or they are groups capable of combining together to form a benzene or naphthalene ring; and $R^{11}$ is a hydrogen atom, an alkyl group, an alkoxy group, an aryloxy group, an acyl group, an alkoxycarbonyl group, an aryloxycarbonyl group, a halogen atom, a monoalkylamino group, a dialkylamino group, an amido group or a nitro group, which may be either substituted or not substituted);

(iv) $A^2$ is a divalent group which is derived from a heterocyclic ring nucleus selected from the group consisting of imidazole, 3H-indole, thiazole, benzothiazole, naphthothiazole, thianaphtheno-7',6',4,5-thiazole, oxazole, benzoxazole, naphthoxazole, selenazole, benzoselenazole, naphthoselenazole, thiazoline, 2-quinoline, 4-quinoline, 1-isoquinoline, benzimidazole, 2-pyridine, and 4-pyridine; and (v) B is an atom group necessary to form a divalent group which is derived from a carbon ring or heterocyclic ring containing the oxo oxygen atom of the carbonyl group linked to one of the rings represented by the following formulae:

(wherein W is O, S or $SO_2$; $R^{15}$ is the same as $R^{11}$; $R^{16}$ is an alkyl group, an aralkyl group or an unsubstituted or substituted aryl group; and $R^{17}$ and $R^{18}$ may be the same or different, and are each an alkyl group, an arlkyl group; or an unsubstituted or substituted phenyl group).

2. The electrophotographic light-sensitive material as claimed in claim 1, wherein the electrophotographic light-sensitive layer is a single layer containing the charge-generating material and the charge-transporting material.

3. The electrophotographic light-sensitive material as claimed in claim 1, wherein the electrophotographic light-sensitive layer comprises a charge-generating layer containing the charge-generating material and a charge-transporting layer containing the charge-transporting material.

4. An electrophotographic light-sensitive material as claimed in claim 2, wherein the light-sensitive layer has a thickness of from 3 to 50 μm.

5. An electrophotographic light-sensitive material as claimed in claim 2, wherein the thickness of the light-sensitive layer is from 5 to 20 μm.

6. An electrophotographic light-sensitive material as claimed in claim 3, wherein the charge-generating layer has thickness of 5 μm or less.

7. An electrophotographic light-sensitive material as claimed in claim 3, wherein the charge-generating layer has a thickness of 2 μm or less.

8. An electrophotographic light-sensitive material as claimed in claim 3, wherein the charge-transporting layer has a thickness of from 3 to 50 μm.

9. An electrophotographic light-sensitive material as claimed in claim 3, wherein the charge-transporting layer has a thickness of from 5 to 20 μm.

10. An electrophotographic light-sensitive material as claimed in claim 1, wherein the charge-generating material is present in the electrophotographic light-sensitive layer in a proportion of 1 to 150% by weight based on the weight of a binder.

11. An electrophotographic light-sensitive material as claimed in claim 1, wherein the charge-generating material is present in the electrophotographic light-sensitive layer in a proportion of 5 to 50% by weight based on the weight of a binder.

12. An electrophotographic light-sensitive material as claimed in claim 1, wherein the charge-transporting material is present in the electrophotographic light-sensitive layer in a proportion of from 10 to 150% by weight based on the weight of a binder.

13. An electrophotographic light-sensitive material as claimed in claim 1, wherein the charge-transporting material is present in the electrophotographic light-sensitive layer in a portion of from 30 to 100% by weight based on the weight of a binder.

14. An electrophotographic light-sensitive aterial as claimed in any of claims 2 or 3, wherein the charge-generating material is dispersed in a POLYMEROUS binder in an amount of 10 parts by weight or less per one part by weight of the compound represented by the general formula (I) or (II).

* * * * *